US012427767B2

(12) United States Patent
Toyofuku et al.

(10) Patent No.: US 12,427,767 B2
(45) Date of Patent: Sep. 30, 2025

(54) METHOD OF DETERMINING EJECTION STATE

(71) Applicant: SEIKO EPSON CORPORATION, Tokyo (JP)

(72) Inventors: Atsushi Toyofuku, Shiojiri (JP); Toshiro Murayama, Fujimi (JP)

(73) Assignee: SEIKO EPSON CORPORATION (JP)

(*) Notice: Subject to any disclaimer, the term of this patent is extended or adjusted under 35 U.S.C. 154(b) by 259 days.

(21) Appl. No.: 18/339,355

(22) Filed: Jun. 22, 2023

(65) Prior Publication Data

US 2023/0415478 A1 Dec. 28, 2023

(30) Foreign Application Priority Data

Jun. 23, 2022 (JP) ................................ 2022-100906

(51) Int. Cl.
*B41J 2/045* (2006.01)

(52) U.S. Cl.
CPC ....... *B41J 2/04573* (2013.01); *B41J 2/04586* (2013.01)

(58) Field of Classification Search
CPC ...... B41J 2/15; B41J 2/04558; B41J 2/04573; B41J 2/04586; B41J 2/2142; B41J 2/2139
See application file for complete search history.

(56) References Cited

U.S. PATENT DOCUMENTS

2009/0231368 A1* 9/2009 Nakano ................. B41J 2/2146 347/85
2021/0229420 A1 7/2021 Murayama et al.

FOREIGN PATENT DOCUMENTS

JP 2021-115725 A 8/2021

* cited by examiner

*Primary Examiner* — Thinh H Nguyen
(74) *Attorney, Agent, or Firm* — Harness, Dickey & Pierce, P.L.C.

(57) ABSTRACT

A method of determining an ejection state of a liquid ejecting head having a plurality of nozzles that are arrayed in a second direction intersecting a first direction and from which liquid is ejected in the first direction includes: an acquiring step of acquiring a plurality of positional information items by capturing, at a plurality of timings, images of droplets ejected from the plurality of nozzles; and a determining step of determining the ejection state based on the plurality of positional information items.

14 Claims, 11 Drawing Sheets

METHOD OF DETERMINING EJECTION STATE

The present application is based on, and claims priority from JP Application Serial Number 2022-100906, filed Jun. 23, 2022, the disclosure of which is hereby incorporated by reference herein in its entirety.

BACKGROUND

1. Technical Field

The present disclosure relates to a method of determining an ejection state.

2. Related Art

In a liquid ejecting apparatus represented by an ink jet printer, liquid such as ink is ejected from a nozzle by applying a drive pulse to a drive element such as a piezoelectric element in general. An ejection characteristic such as the amount of the ink ejected from the nozzle or the speed at which the ink is ejected from the nozzle may be measured and used to design or adjust the liquid ejecting apparatus.

For example, JP-A-2021-115725 describes a technique for measuring an ejection characteristic such as the amount of liquid ejected or the speed at which the liquid is ejected and determining a waveform of a drive pulse based on the result of the measurement.

When the angles at which ink is ejected from a plurality of nozzles are different, the speeds at which ink is ejected from the plurality of nozzles are different, or ink is not ejected from a nozzle, the ejection of ink from a liquid ejecting head may be unstable, and as a result, a defect such as unevenness or a lack of an ink dot may occur in an obtained image. An index for evaluating the occurrence of such a defect as an ejection characteristic of the liquid ejecting head is the "stability of the ejection".

For example, JP-A-2021-115725 discloses a method of measuring an ejection angle. The measurement method predicts a deviation of an ejection direction based on the amount of deviation of a dot that landed on a recording medium after ejection of liquid to the recording medium from an ideal position of the dot in a surface direction of the recording medium, and a distance from a liquid ejecting head to the recording medium in a vertical direction. When the measurement method is performed on each nozzle, it is possible to evaluate a difference between the angles at which liquid is ejected from the nozzles as one of factors regarding the stability of the ejection.

However, in the measurement method, only the ejection angles can be evaluated. For example, to evaluate the ejection speeds, non-ejection, or the like in addition to the ejection angles, it is necessary to use another method and there is a problem in terms of the number of processes or ink consumption.

SUMMARY

According to an aspect of the present disclosure, a method of determining an ejection state of a liquid ejecting head having a plurality of nozzles that are arrayed in a second direction intersecting a first direction and from which liquid is ejected in the first direction includes an acquiring step of acquiring a plurality of positional information items by capturing, at a plurality of timings, images of droplets ejected from the plurality of nozzles, and a determining step of determining the ejection state based on the plurality of positional information items.

DESCRIPTION OF EXEMPLARY EMBODIMENTS

Figure 1:
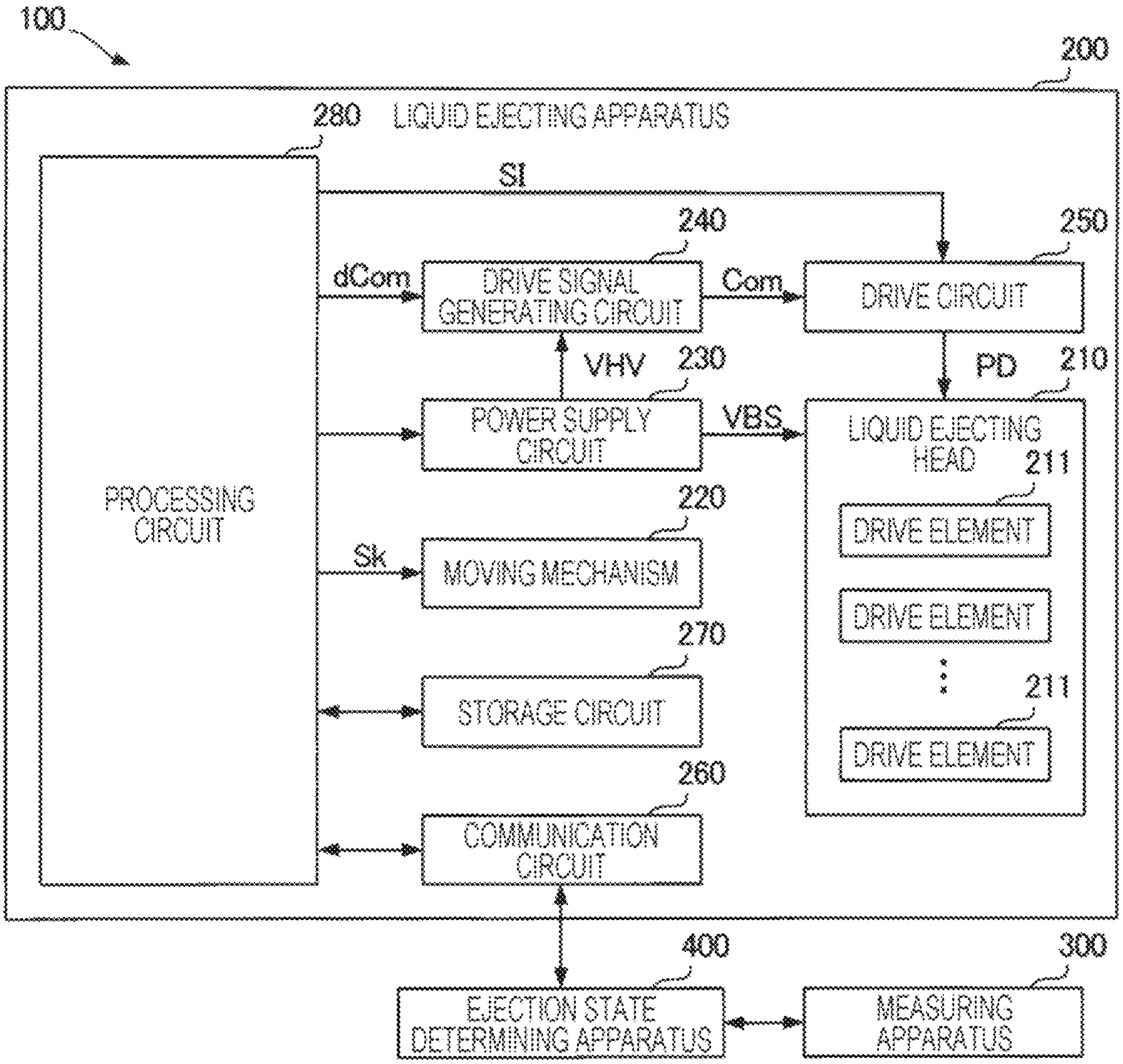
FIG. 1 is a schematic diagram illustrating an example of a configuration of a system including an ejection state determining apparatus according to an embodiment.

Hereinafter, preferred embodiments of the present disclosure are described with reference to the accompanying drawings. In the drawings, dimensions and scale of each section are appropriately different from the actual dimensions and scale, and some sections are schematically illustrated to facilitate understanding. In addition, the scope of the present disclosure is not limited to the embodiments unless specifically stated to limit the present disclosure in the following description.

1. System Including Ejection State Determining Apparatus

FIG. 1 is a schematic diagram illustrating an example of a configuration of a system 100 including an ejection state determining apparatus 400 according to an embodiment. The system 100 determines an ejection state of ink that is an example of "liquid".

As illustrated in FIG. 1, the system 100 includes a liquid ejecting apparatus 200, a measuring apparatus 300, and the ejection state determining apparatus 400.

The liquid ejecting apparatus 200 is a printer that performs printing on a recording medium using an ink jet method. The recording medium is not limited as long as the liquid ejecting apparatus 200 can perform printing on the recording medium. Examples of the recording medium include various paper sheets, various cloths, and various films. The liquid ejecting apparatus 200 may be a serial-type printer or a line-type printer.

As illustrated in FIG. 1, the liquid ejecting apparatus 200 includes a liquid ejecting head 210, a moving mechanism 220, a power supply circuit 230, a drive signal generating circuit 240, a drive circuit 250, a communication circuit 260, a storage circuit 270, and a processing circuit 280.

The liquid ejecting head 210 ejects ink toward the recording medium. FIG. 1 illustrates a plurality of drive elements 211 as components of the liquid ejecting head 210. Although not illustrated, the liquid ejecting head 210 includes cavities for storing ink, and nozzles communicating with the cavities, in addition to the drive elements 211. Each of the drive elements 211 is provided for a respective one of the cavities and changes pressure in the cavity to eject ink from the nozzle communicating with the cavity. For example, each of the drive elements 211 is a piezoelectric element that deforms a vibration plate constituting a portion of a wall surface of the cavity corresponding to the drive element 211 or is a heater that heats ink within the cavity corresponding to the drive element 211. The liquid ejecting head 210 may be hereinafter simply referred to as a "head".

In the example illustrated in FIG. 1, the number of liquid ejecting heads 210 included in the liquid ejecting apparatus 200 is 1 but may be 2 or more. In this case, for example, the two or more liquid ejecting heads 210 are provided in a unit. When the liquid ejecting apparatus 200 is of a serial type, the liquid ejecting head 210 or the unit including the two or more liquid ejecting heads 210 is used such that a plurality of nozzles are distributed over a portion of the recording medium in a width direction of the recording medium. When the liquid ejecting apparatus 200 is of a line type, the unit including the two or more liquid ejecting heads 210 is used such that a plurality of nozzles are distributed over the entire region of the recording medium in the width direction of the recording medium.

The moving mechanism 220 changes relative positions of the liquid ejecting head 210 and the recording medium to each other. Specifically, when the liquid ejecting apparatus 200 is of the serial type, the moving mechanism 220 includes a transport mechanism that transports the recording medium in a predetermined direction, and a moving mechanism that repeatedly moves the liquid ejecting head 210 along a shaft orthogonal to the transport direction of the recording medium. When the liquid ejecting apparatus 200 is of the line type, the moving mechanism 220 includes a transport mechanism that transports the recording medium in a direction intersecting a longitudinal direction of the unit including the two or more liquid ejecting heads 210.

The power supply circuit 230 receives power supplied from a commercial power source to generate predetermined various potentials. The commercial power source is not illustrated in the drawings. The generated various potentials are appropriately supplied to the sections of the liquid ejecting apparatus 200. For example, the power supply circuit 230 generates a power supply potential VHV and an offset potential VBS. The offset potential VBS is supplied to the liquid ejecting head 210 and the like. The power supply potential VHV is supplied to the drive signal generating circuit 240 and the like.

The drive signal generating circuit 240 generates a drive signal Com for driving each of the drive elements 211 included in the liquid ejecting head 210. Specifically, the drive signal generating circuit 240 includes a DA conversion circuit and an amplifying circuit, for example. In the drive signal generating circuit 240, the DA conversion circuit converts a waveform specifying signal dCom received from the processing circuit 280 from a digital signal to an analog signal, and the amplifying circuit uses the power supply potential VHV from the power supply circuit 230 to amplify the analog signal so as to generate the drive signal Com. The waveform specifying signal dCom is described below. A signal of a waveform that is included in a waveform included in the drive signal Com and is actually supplied to the drive elements 211 is a drive pulse PD.

The drive circuit 250 switches, based on a control signal SI described below, whether to supply, as the drive pulse PD, at least a portion of the waveform included in the drive signal Com to each of the drive elements 211. The drive circuit 250 includes a transmission gate and the like, for example.

The communication circuit 260 is a communication device that is connected to the ejection state determining apparatus 400 such that the communication circuit 260 and the ejection state determining apparatus 400 can communicate with each other. The communication circuit 260 includes interfaces such as a Universal Serial Bus (USB) interface and a local area network (LAN) interface, for example. The communication circuit 260 may be wirelessly connected to the ejection state determining apparatus 400 via Wi-Fi, Bluetooth, or the like or may be connected to the ejection state determining apparatus 400 via a local area network (LAN), the Internet, or the like, for example. Wi-Fi and Bluetooth are registered trademarks.

The storage circuit 270 stores various programs to be executed by the processing circuit 280 and various data to be processed by the processing circuit 280. The various data includes print data. The storage circuit 270 includes, for example, one or both of semiconductor memories that are a volatile memory such as a random-access memory (RAM) and a nonvolatile memory such as a read-only memory (ROM), an electrically erasable programmable ROM (EEPROM), or a programmable ROM (PROM). The print data is supplied from the ejection state determining apparatus 400, for example. The storage circuit 270 may be a portion of the processing circuit 280.

The processing circuit 280 has a function of controlling an operation of each of the sections of the liquid ejecting apparatus 200 and a function of processing various data. The processing circuit 280 includes a processor such as one or more central processing units (CPUs), for example. The processing circuit 280 may include a programmable logic device such as a field-programmable gate array (FPGA) instead of or in addition to the one or more CPUs.

The processing circuit 280 controls the operation of each of the sections of the liquid ejecting apparatus 200 by executing a program stored in the storage circuit 270. The processing circuit 280 generates signals such as a control signal Sk, the control signal SI, and the waveform specifying signal dCom as signals for controlling the operation of each of the sections of the liquid ejecting apparatus 200.

The control signal Sk is a signal for controlling the driving of the moving mechanism 220. The control signal SI is a signal for controlling the driving of the drive circuit 250.

Specifically, the control signal SI specifies, in each predetermined unit time period, whether the drive circuit 250 supplies, as the drive pulse PD, the drive signal Com from the drive signal generating circuit 240 to the liquid ejecting head 210. This specifying specifies an amount of ink to be ejected from the liquid ejecting head 210 and the like. The waveform specifying signal dCom is a digital signal for defining the waveform of the drive signal Com to be generated by the drive signal generating circuit 240.

The measuring apparatus 300 measures an ejection characteristic of ink from the liquid ejecting head 210. Examples of the ejection characteristic include, for example, the speed at which the ink is ejected, the angle at which the ink is ejected, the amount of the ink ejected, the number of satellite droplets, and the stability of the ejection. Hereinafter, the ejection characteristic of the ink from the liquid ejecting head 210 may be simply referred to as an "ejection characteristic".

The measuring apparatus 300 according to the present embodiment is an imaging device that images flying ink ejected from the liquid ejecting head 210. Specifically, the measuring apparatus 300 includes an imaging optical system and an imaging element, for example. The imaging optical system is an optical system including at least one imaging lens and may include various optical elements such as a prism or may include a zoom lens, a focusing lens, or the like. The imaging element is a charge coupled device (CCD) image sensor, a complementary MOS (CMOS) image sensor, or the like, for example. A result of image capturing by the imaging element is input to the ejection state determining apparatus 400, and the ejection state determining apparatus 400 performs arithmetic processing using the result of the image capturing to calculate each ejection characteristic. The measurement of the ejection characteristic by the measuring apparatus 300 is described below in detail with reference to FIG. 3.

The number of pixels of the imaging element is not limited as long as the imaging element can identify the positions of droplets DR as described below.

The ejection state determining apparatus 400 is a computer that controls operations of the liquid ejecting apparatus 200 and the measuring apparatus 300. The ejection state determining apparatus 400 is connected to the liquid ejecting apparatus 200 and the measuring apparatus 300 wirelessly or through a cable such that the ejection state determining apparatus 400 and the liquid ejecting apparatus 200 can communicate with each other and that the ejection state determining apparatus 400 and the measuring apparatus 300 can communicate with each other. The connection may be established via a communication network including a LAN or the Internet.

The ejection state determining apparatus 400 has a function of determining the ejection characteristic of the liquid ejecting head 210 of the liquid ejecting apparatus 200 described above. The result of the determination is used to design or adjust the liquid ejecting apparatus 200 described below, for example. In this case, examples of the adjustment include head selection, ink selection, design of the waveform of the drive pulse PD, and sequence design. In addition, processing such as cleaning may be performed based on the result of the determination. The configuration of the ejection state determining apparatus 400 is described below in detail with reference to FIG. 3.

2. Measurement of Ejection Characteristic

Figure 2:
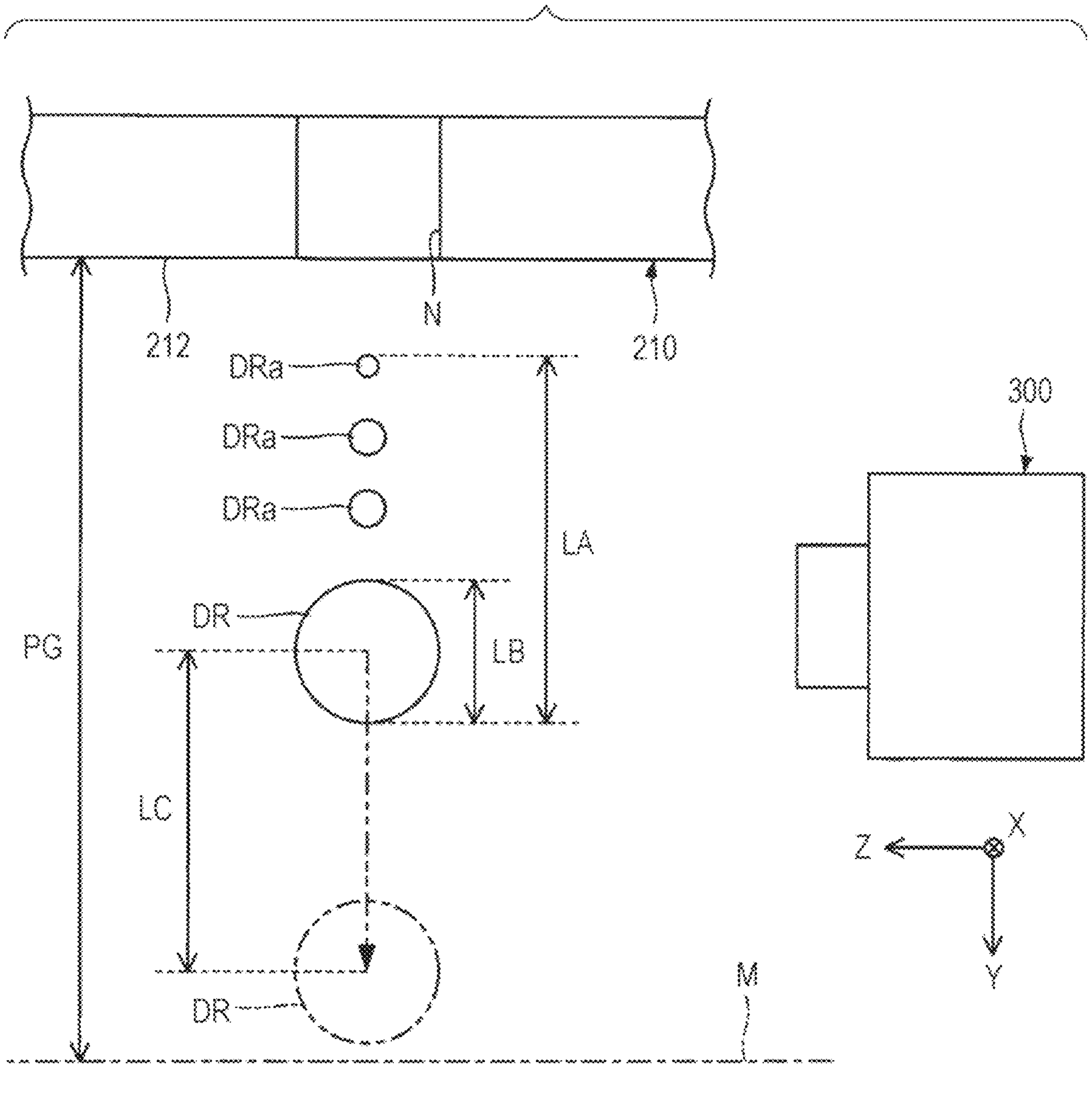
FIG. 2 is a diagram illustrating measurement of an ejection characteristic.

FIG. 2 is a diagram illustrating the measurement of the ejection characteristic. As illustrated in FIG. 2, the measuring apparatus 300 captures, from a Z direction perpendicular to or intersecting a Y direction, an image of the state of a flying droplet DR of ink ejected from a nozzle N of the liquid ejecting head 210 in the Y direction. In this case, the Y direction is an example of a "first direction" and an X direction perpendicular to or intersecting the Y direction and the Z direction is an example of a "second direction".

In the example illustrated in FIG. 2, the liquid ejecting head 210 has a nozzle surface 212 with the open nozzle N. Normally, the nozzle surface 212 is disposed parallel to a print surface of the recording medium M.

The droplet DR is a main droplet ejected from the nozzle N. In the example illustrated in FIG. 2, the droplet DR and a plurality of droplets DRa, which are referred to as satellite droplets and are secondarily generated subsequent to the generation of the droplet DR, are ejected from the nozzle N. The droplets DRa have diameters smaller than that of the droplet DR. Whether the droplets DRa are generated, the number of the droplets DRa, the sizes of the droplets DRa, and the like vary depending on the type of the ink, the waveform of the drive pulse PD, or the like.

The measuring apparatus 300 continuously captures an image of the flying droplet DR or intermittently captures an image of the flying droplet DR at very short time intervals. Although FIG. 2 illustrates the one nozzle N as a representative for convenience of explanation, the measuring apparatus 300 captures, at different timings, images of a plurality of flying droplets DR ejected from the plurality of nozzles N as described below. The plurality of timings are based on an ejection start timing at which a droplet DR is ejected from each of the nozzles N. The plurality of timings may be timings within a time period for which the same droplets DR ejected from the plurality of nozzles N once are flying or may be timings within a time period for which different droplets DR ejected from the plurality of nozzles N a plurality of times are flying. Examples of a specific method of the image capturing include synthesis of results of the image capturing by image processing, light emission performed by a light emitting unit (strobe) a plurality of times in a state in which a shutter of the measuring apparatus 300 is opened. In this case, the time periods for which the droplets DR are "flying" are time periods from when the droplets DR are ejected from the nozzles N to when the droplets DR land on the recording medium M. When a plurality of droplets DR ejected from the nozzles N a plurality of times (at a plurality of timings) fly in an image capturing region of the measuring apparatus 300 simultaneously, the measuring apparatus 300 may capture, at one time, an image of the plurality of droplets DR ejected from the plurality of nozzles N the plurality of times.

As described above, it is possible to measure the positions of droplets DR at each timing by using results obtained by performing the image capturing at a plurality of timings, and to measure a difference between the directions in which the droplets DR are ejected from the nozzles N, a difference between the speeds at which the droplets DR are ejected from the nozzles N, non-ejection, or the like as a factor of the stability of the ejection.

The results of the image capturing by the measuring apparatus 300 may be used for the measurement of an ejection characteristic other than the stability of the ejection. For example, a timing at which a distance that a droplet DR from the liquid ejecting head 210 flies reaches a predetermined distance may be calculated based on the speed at which the droplet DR is ejected and the predetermined distance. When the predetermined distance is a distance PG from the nozzle surface 212 to the recording medium M, a timing at which the droplet DR reaches the recording medium M is calculated based on the speed at which the droplet DR is ejected and the predetermined distance. The predetermined distance is known or is measured and obtained.

The amount of the droplet DR from the liquid ejecting head 210 is calculated as the volume of the droplet DR based on the diameter LB of the droplet DR using an image captured by the measuring apparatus 300, for example. In addition, the speed at which the droplet DR is ejected from the liquid ejecting head 210 is calculated based on a distance LC between any two positions of the flying droplet DR and the length of a time period from when the droplet DR passes one of the two positions to when the droplet DR passes the other of the two positions. FIG. 2 illustrates the droplet DR when the predetermined time period elapses using a dashed-and-double-dotted line. In addition, the aspect ratio (LA/LB) of the ink from the liquid ejecting head 210 can be calculated as the ejection characteristic of the ink. The angle at which the ink is ejected from the liquid ejecting head 210 can be calculated based on the positional relationship between the position of the droplet DR before the predetermined time period and the position of the droplet DR after the predetermined time period. In addition, the amount of the droplet DR from the liquid ejecting head 210 may be calculated as the mass of the droplet DR based on the diameter LB of the droplet DR and the density of the droplet DR.

3. Ejection State Determining Apparatus

Figure 3:
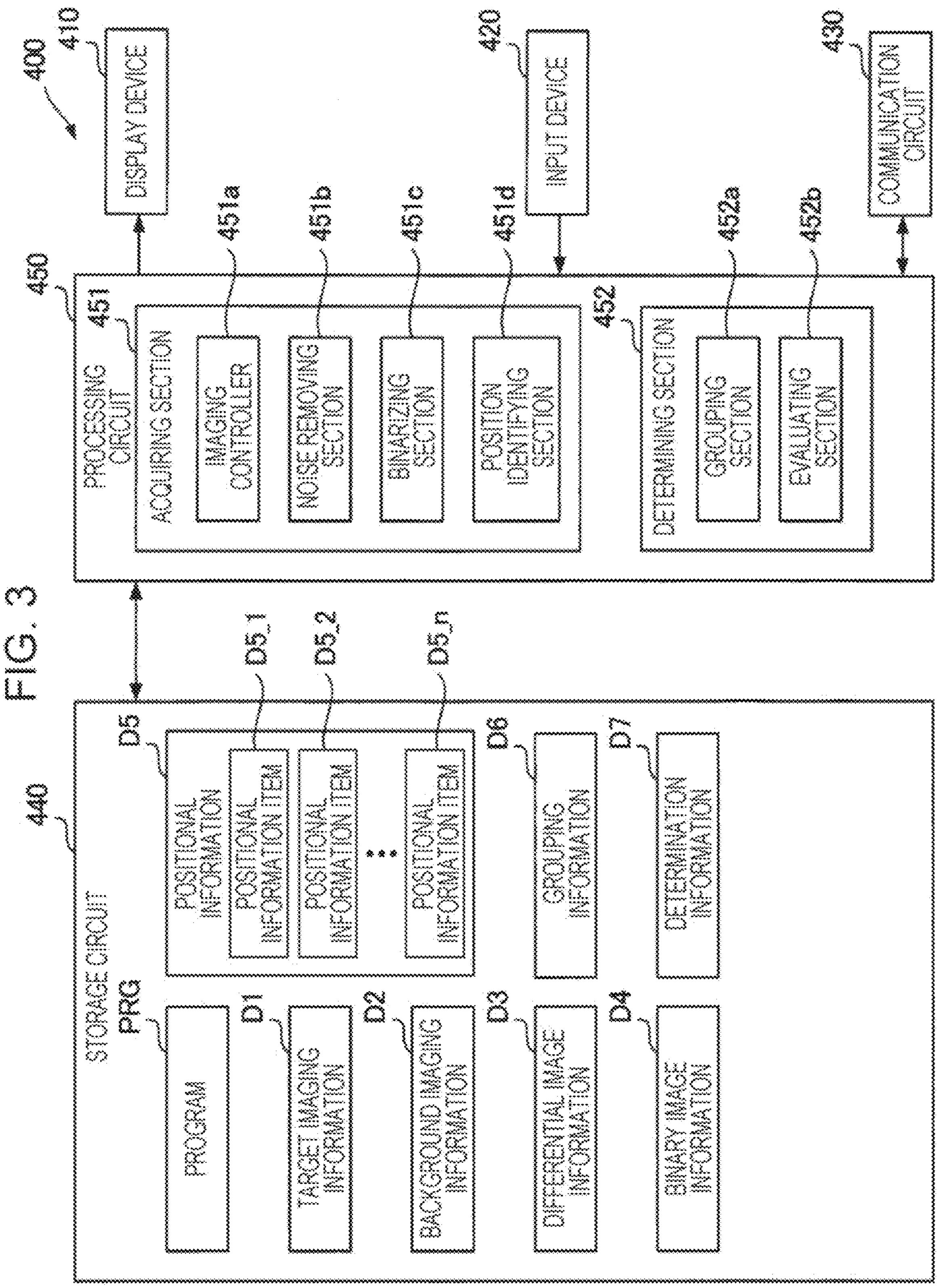
FIG. 3 is a diagram illustrating the ejection state determining apparatus according to the embodiment.

FIG. 3 is a diagram illustrating the ejection state determining apparatus 400 according to the first embodiment. As illustrated in FIG. 3, the ejection state determining apparatus 400 includes a display device 410, an input device 420, a communication circuit 430, a storage circuit 440, and a processing circuit 450. The display device 410, the input device 420, the communication circuit 430, the storage circuit 440, and the processing circuit 450 are connected to each other such that the display device 410, the input device 420, the communication circuit 430, the storage circuit 440, and the processing circuit 450 can communicate with each other.

The display device 410 displays various images under control by the processing circuit 450. The display device 410 includes, for example, a display panel among various display panels such as a liquid display panel and an electro-luminescence (EL) display panel. The display device 410 may be disposed outside the ejection state determining apparatus 400. The display device 410 may be a component of the liquid ejecting apparatus 200.

The input device 420 receives an operation from a user. For example, the input device 420 includes a pointing device such as a touch pad, a touch panel, or a mouse. When the input device 420 includes a touch panel, the input device 420 may serve as the display device 410. The input device 420 may be disposed outside the ejection state determining apparatus 400. The input device 420 may be a component of the liquid ejecting apparatus 200.

The communication circuit 430 is a communication device that is connected to the liquid ejecting apparatus 200 and the measuring apparatus 300 such that the communication circuit 430 can communicate with the liquid ejecting apparatus 200 and the measuring apparatus 300. For example, the communication circuit 430 includes an interface such as a USB interface or a LAN interface. For example, the communication circuit 430 may be wirelessly connected to the liquid ejecting apparatus 200 or the measuring apparatus 300 via Wi-Fi, Bluetooth, or the like or may be connected to the liquid ejecting apparatus 200 or the measuring apparatus 300 via a local area network (LAN), the Internet, or the like.

The storage circuit 440 is a device that stores various programs to be executed by the processing circuit 450 and various data to be processed by the processing circuit 450. The storage circuit 440 includes a hard disk drive or a semiconductor memory, for example. A portion of the storage circuit 440 or the entire storage circuit 440 may be disposed in a storage device, a server, or the like disposed outside the ejection state determining apparatus 400.

In the storage circuit 440 according to the present embodiment, a program PRG, target imaging information D1, background imaging information D2, differential image information D3, binary image information D4, positional information D5, grouping information D6, and determination information D7 are stored. In the storage circuit 440, not only the information D1 to D7 and the program PRG but also other information regarding the ejection characteristic, the waveform used for the measurement by the measuring apparatus 300, information regarding measurement conditions such as a temperature, and the like may be included.

The target imaging information D1 indicates a target image obtained by using the measuring apparatus 300 to capture, at a plurality of different timings, images of a plurality of flying droplets DR ejected from the plurality of nozzles N. The background imaging information D2 indicates a background image captured by using the measuring apparatus 300 in a state in which a droplet DR is not ejected from the plurality of nozzles N. The background image indicates the same region as that of the target image indicated in the target imaging information D1. The differential image information D3 indicates a differential image obtained by removing the background image indicated in the background imaging information D2 from the target image indicated in the target imaging information D1. The binary image information D4 indicates a binarized image in which the differential image indicated in the differential image information D3 is represented by ON pixels and OFF pixels. The binary image information D4 indicates each droplet DR as a set of a plurality of ON pixels. The set may be hereinafter referred to as an “ON pixel set”. The background imaging information D2 and the differential image information D3 are used as needed and may be omitted. In this case, the binary image information D4 indicates an image obtained by binarizing the target image indicated in the target imaging information D1.

The positional information D5 indicates the positions of the plurality of droplets DR ejected from the plurality of nozzles N at each of the timings described above and includes a number n of positional information items D5_1 to D5_*n*. In this case, n is a natural number greater than or equal to 4. The positional information items D5_1 to D5_*n* indicate the positions of the plurality of ON pixel sets in the image indicated in the binary image information D4 described above. Each of the positional information items D5_1 to D5_*n* may indicate the position in an image coordinate system set in the binary image information D4 or may indicate the position in the world coordinate system set in the actual space. The grouping information D6 indicates results of grouping of the positions of the plurality of droplets DR ejected from the plurality of nozzles N into groups in which the droplets DR are arranged in a predetermined direction. The determination information D7 indicates the ejection state regarding the stability of the ejection from the plurality of nozzles N. Details of the positional information D5, the grouping information D6, and the determination information D7 are described below with reference to FIGS. 7 to 14.

The program PRG is an example of an ejection state determination program for determining the ejection state of the liquid ejecting head 210 having the plurality of nozzles N that are arrayed in the X direction and from which ink is ejected in the Y direction.

The processing circuit 450 is a device having a function of controlling each of the sections of the ejection state determining apparatus 400, the liquid ejecting apparatus 200, and the measuring apparatus 300, and a function of processing various data. The processing circuit 450 includes, for example, a processor such as a central processing unit (CPU). The processing circuit 450 may include a single processor or a plurality of processors. One or more or all of the functions of the processing circuit 450 may be implemented by hardware such as a digital signal processor (DSP), an application specific integrated circuit (ASIC), a programmable logic device (PLD), or a field programmable gate array (FPGA).

The processing circuit 450 functions as an acquiring section 451 and a determining section 452 by reading the program PRG from the storage circuit 440 and executing the program PRG.

The acquiring section 451 acquires the plurality of positional information items D5_1 to D5_*n* by capturing, at a plurality of timings, images of droplets DR ejected from the plurality of nozzles N or by capturing an image of droplets DR ejected at a plurality of timings from the plurality of nozzles N. In the example illustrated in FIG. 3, the acquiring section 451 includes an imaging controller 451*a*, a noise removing section 451*b*, a binarizing section 451*c*, and a position identifying section 451*d*.

The imaging controller 451*a* controls the operation of the measuring apparatus 300. Specifically, the imaging controller 451*a* uses the measuring apparatus 300 to generate the target imaging information D1 and the background imaging information D2.

The noise removing section 451*b* generates the differential image information D3 based on the target imaging information D1 and the background imaging information D2. Specifically, the noise removing section 451*b* generates the differential image information D3 by calculating, for each pixel, a difference in luminescence between the target image indicated in the target imaging information D1 and the background image indicated in the background imaging information D2. Before the calculation of the differences, image processing such as color adjustment and resizing is performed on either or both of the target imaging information D1 and the background imaging information D2 as needed.

The binarizing section 451*c* generates the binary image information D4 based on the differential image information D3. Specifically, the binarizing section 451*c* performs binarization processing on the differential image information D3 to generate the binary image information D4 represented by ON pixels and OFF pixels. When the background imaging information D2 and the differential image information D3 are not used, the binarizing section 451*c* may perform binarization processing on the target imaging information D1 to generate the binary image information D4.

The position identifying section 451*d* generates the positional information D5 based on the binary image information D4. Specifically, the position identifying section 451*d* generates the positional information D5 by performing labeling on each ON pixel set in the image indicated in the binary image information D4 and calculating the positions of the droplets based on the position of each ON pixel set in the image.

The determining section 452 determines the ejection state of the liquid ejecting head 210 based on the positional information D5. By performing the determination, the determination information D7 is generated. In the example illustrated in FIG. 3, the determining section 452 includes a grouping section 452*a* and an evaluating section 452*b*.

The grouping section 452*a* generates the grouping information D6 by grouping the plurality of positional information items D5_1 to D5_*n* into groups in which the positional information items D5_1 to D5_*n* are arranged in the Y direction or by grouping the plurality of positional information items D5_1 to D5_*n* into groups in which the positional information items D5_1 to D5_*n* are arranged in the X direction. In this case, each of the "groups in which the positional information items D5_1 to D5_*n* are arranged in the X direction" is a group of a plurality of ON pixel sets of which at least portions overlap each other as viewed in the X direction. Similarly, each of the "groups in which the positional information items D5_1 to D5_*n* are arranged in the Y direction" is a group of a plurality of ON pixel sets of which at least portions overlap each other as viewed in the Y direction.

The evaluating section 452*b* generates the determination information D7 based on the grouping information D6. Specifically, the evaluating section 452*b* evaluates the ejection state of the liquid ejecting head 210 based on the width of each of the groups indicated in the grouping information D6 in the Y direction, the width of each of the groups indicated in the grouping information D6 in the X direction, an interval between the groups, and the number of the groups, and generates the determination information D7 based on the result of the evaluation.

4. Method of Determining Ejection State

Figure 4:
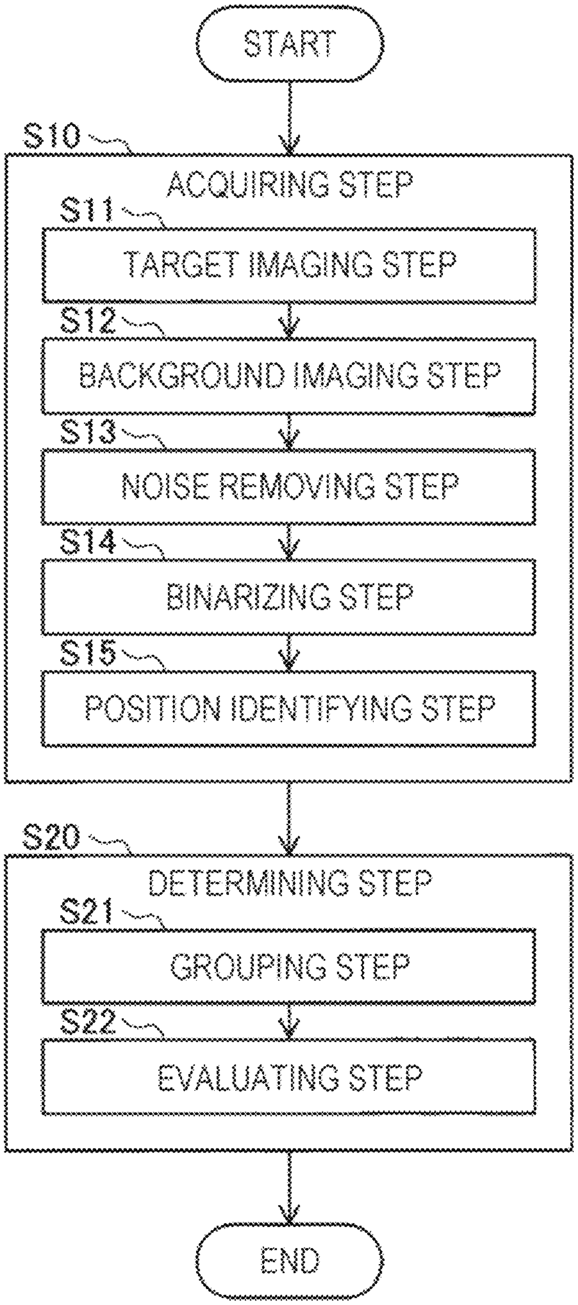
FIG. 4 is a flowchart illustrating a method of determining an ejection state according to the embodiment.

FIG. 4 is a flowchart illustrating a method of determining the ejection state according to the embodiment. The method of determining the ejection state is performed using the ejection state determining apparatus 400 described above. The method of determining the ejection state includes an acquiring step S10 and a determining step S20 in this order as illustrated in FIG. 4.

In the acquiring step S10, the acquiring section 451 acquires the plurality of positional information items D5_1 to D5_*n*. In the example illustrated in FIG. 4, the acquiring step S10 includes a target imaging step S11, a background imaging step S12, a noise removing step S13, a binarizing step S14, and a position identifying step S15 in this order.

In the target imaging step S11, the imaging controller 451*a* uses the measuring apparatus 300 to generate the target imaging information D1. In the background imaging step S12, the imaging controller 451*a* uses the measuring apparatus 300 to generate the background imaging information D2. In the noise removing step S13, the noise removing section 451*b* generates the differential image information D3 based on the target imaging information D1 and the background imaging information D2. In the binarizing step S14, the binarizing section 451*c* generates the binary image information D4 based on the differential image information D3. In the position identifying step S15, the position identifying section 451*d* generates the positional information D5 based on the binary image information D4. The acquiring step S10 is described below in detail with reference to FIGS. 5 and 6.

It suffices for the background imaging step S12 to be performed before the noise removing step S13, and the background imaging step S12 is not limited to the example illustrated in FIG. 4 and may be performed before the target imaging step S11. In addition, when the acquiring step S10 and the determining step S20 are repeatedly performed a plurality of times, it suffices for the background imaging step S12 to be performed at least once. However, when the acquiring step S10 and the determining step S20 are repeatedly performed a plurality of times, an effect of removing noise by the noise removing step S13 is preferably obtained by performing the background imaging step S12 each time.

In the determining step S20, the determining section 452 determines the ejection state of the liquid ejecting head 210 based on the positional information D5. In the example illustrated in FIG. 4, the determining step S20 includes a grouping step S21 and an evaluating step S22 in this order.

In the grouping step S21, the grouping section 452*a* generates the grouping information D6. In the evaluating step S22, the evaluating section 452*b* generates the determination information D7 based on the grouping information D6. The evaluating step S22 is described below in detail with reference to FIGS. 7 to 14.

4-1. Acquiring Step

Figure 5:
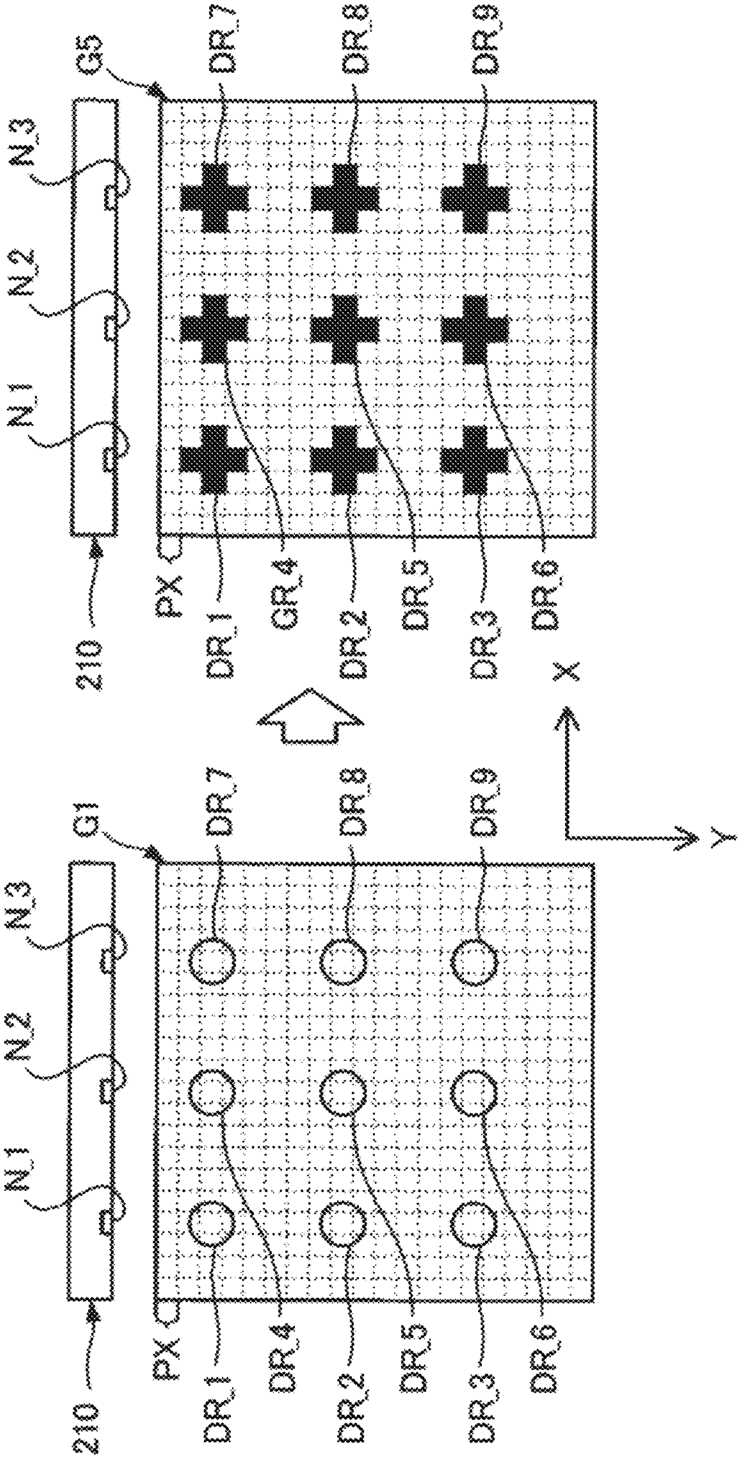
FIG. 5 is a diagram illustrating an acquiring step.

FIG. 5 is a diagram illustrating the acquiring step S10. FIG. 5 illustrates a target image G1 indicated in the target imaging information D1 and an image G5 indicated in the positional information D5 when images of droplets DR normally ejected from three nozzles N_1 to N_3 are captured at a plurality of timings. Each of the images includes a plurality of pixels PX arrayed in a matrix in directions corresponding to the X direction and the Y direction. The array, the number, and the like of the plurality of pixels PX forming each of the images are not limited to the example illustrated in FIG. 5 and are arbitrary.

The nozzles N_1 to N_3 are any three nozzles among the plurality of nozzles N included in the liquid ejecting head 210. In FIG. 5, the number of nozzles N that eject the droplets DR to be imaged is three for convenience of explanation, but is not limited to 3 and may be 2 or 4 or more.

As illustrated on the left side in FIG. 5, droplets DR_1 to DR_9 are included in the target image G1. The droplets DR_1 to DR_3 are ejected from the nozzle N_1, and images of the droplets DR_1 to DR_3 are captured at different timings. The droplets DR_4 to DR_6 are ejected from the nozzle N_2, and images of the droplets DR_4 to DR_6 are captured at the different timings. The droplets DR_7 to DR_9 are ejected from the nozzle N_3, and images of the droplets DR_7 to DR_9 are captured at the different timings.

The images of the droplets DR_1, DR_4, and DR_7 are captured at the same timing. The images of the droplets DR_2, DR_5, and DR_8 are captured at the same timing. The images of the droplets DR_3, DR_6, and DR_9 are captured at the same timing.

The positional information D5 is acquired based on the target imaging information D1 indicating the target image G1 described above. The positional information D5 indicates the image G5 as illustrated on the right side in FIG. 5. The image G5 includes the droplets DR_1 to DR_9 binarized.

The image G5 is obtained by binarizing, for each of the pixels PX, the target image G1 or an image based on the target image G1 into ON pixels PX_ON in which the droplets DR are present and OFF pixels PX_OFF in which the droplets DR are not present. In this case, a group of a plurality of adjacent ON pixels PX_ON indicates a droplet DR.

Figure 6:
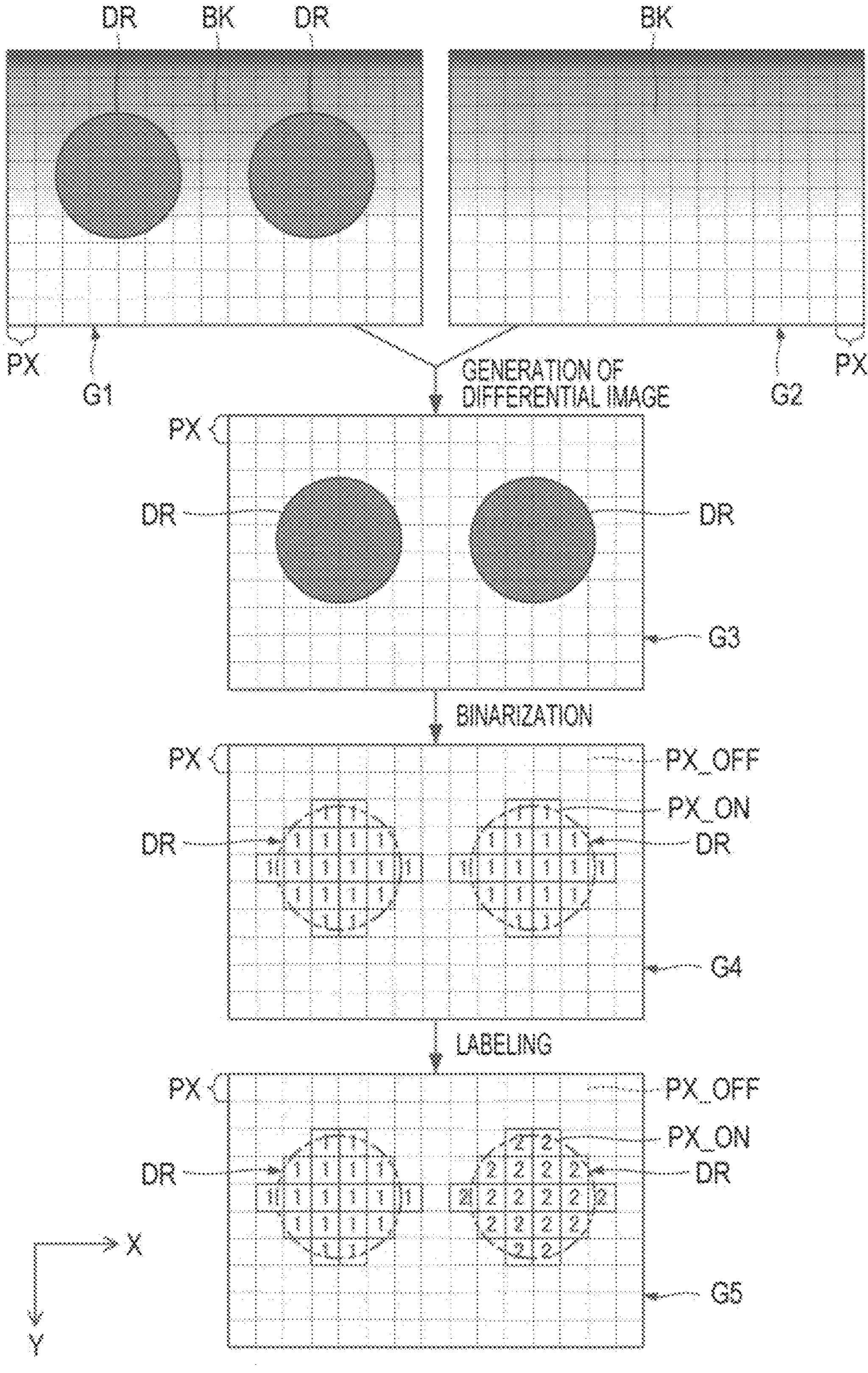
FIG. 6 is a diagram illustrating details of the acquiring step.

FIG. 6 is a diagram illustrating details of the acquiring step S10. FIG. 6 illustrates the target image G1 indicated in the target imaging information D1, the background image G2 indicated in the background imaging information D2, the differential image G3 indicated in the differential image information D3, the binary image G4 indicated in the binary image information D4, and the image G5 indicated in the positional information D5. FIG. 6 illustrates, for each of the images, a portion including two droplets DR or a portion corresponding to the portion including the two droplets DR as a representative.

As illustrated on the left side of the first row in FIG. 6, the target image G1 indicated in the target imaging information D1 includes a plurality of droplets DR ejected from the plurality of nozzles N together with a background BK. On the other hand, as illustrated on the right side of the first row in FIG. 6, the background image G2 indicated in the background imaging information D2 includes only the background BK.

As illustrated in the second row in FIG. 6, in the noise removing step S13 described above, the differential image G3 indicated in the differential image information D3 is obtained based on a difference between the target image G1 and the background image G2. The differential image G3 includes the plurality of droplets DR based on the target image G1 in a state in which the background BK described above is removed from the differential image G3.

Even when the contrast between the droplets DR and the background BK is low due to insufficient illumination or even when dirt is attached to a lens of a camera of the measuring apparatus 300, it is possible to remove noise from the target image G1 and improve the accuracy of detecting the droplets DR by performing the noise removing step S13 described above.

Before the generation of the differential image G3, processing of reducing the resolution of the target image G1 and the resolution of the background image G2 may be performed without interfering with the subsequent processing. In this case, it is possible to reduce a period of time required for the subsequent processing.

As illustrated in the third row in FIG. 6, in the binarizing step S14 described above, the binary image G4 indicated in the binary image information D4 is obtained by binarizing the differential image G3. The binary image G4 includes a plurality of ON pixels PX_ON and a plurality of OFF pixels PX_OFF. Each of the ON pixels PX_ON is a pixel PX in which a droplet DR is present. A single set of adjacent pixels PX_ON among the plurality of ON images PX_ON indicates a single droplet DR. Each of the OFF pixels PX_OFF is a pixel PX in which a droplet DR is not present.

In the example illustrated in FIG. 6, each of the ON pixels PX_ON is displayed with "1". Whether a droplet DR is present in a pixel PX is determined by determining whether the luminescence of the pixel PX is equal to or higher than a predetermined value or is equal to or lower than the predetermined value. The predetermined value is appropriately set according to the brightness of illumination. The predetermined value may be the same for all the pixels PX or may vary depending on a distribution of the brightness of the illumination.

Also in this case, by performing the binarizing step S14, it is possible to remove noise from the target image G1 and extract, from the target image G1, pixels PX in which the droplets DR are present with high accuracy.

As illustrated in the fourth row in FIG. 6, in the position identifying step S15 described above, the image G5 is obtained by performing labeling processing on the binary image G4. The image G5 includes a plurality of ON pixels PX_ON and a plurality of OFF pixels PX_OFF. However, a plurality of sets of adjacent ON pixels PX_ON among the plurality of ON pixels PX_ON are labeled with different values. In the example illustrated in FIG. 6, ON pixels PX_ON included in one of two sets are displayed with "1", and ON pixels PX_ON included in the other set are displayed with "2".

By performing the position identifying step S15 described above, the positional information D5 including the positional information items D5_1 to D5_*n* is obtained as information indicating the position of each of the droplets DR. In the example illustrated in FIG. 6, the positional information D5 is image information indicating the image G5 and includes the positional information items D5_1 to D5_9. The positional information item D5_1 indicates the position of the droplet DR_1. The positional information item D5_2 indicates the position of the droplet DR_2. The positional information item D5_3 indicates the position of the droplet DR_3. The positional information item D5_4 indicates the position of the droplet DR_4. The positional information item D5_5 indicates the position of the droplet DR_5. The positional information item D5_6 indicates the position of the droplet DR_6. The positional information items D5_1 to D5_*n* may be information indicating results of the calculation of the position of each of the droplets DR as a coordinate value based on the image G5.

4-2. Determining Step

Determination methods in the determining step S20 are mainly classified into a determination method based on the arrangement of groups and a determination method based on a distribution of droplets in each of the groups. In the determining step S20, one type of determination method may be used alone or two or more types of determination methods may be used in combination. It is possible to prevent erroneous determination in the determining step S20 by performing the determining step S20 using a combination of two or more types of determination methods. In addition, in the determining step S20, the stability of the ejection may be quantified as the degree of stability in addition to the determination as to whether the stability of the ejection is high. An example of the quantification is described below in a second embodiment.

In the determination method based on the arrangement of groups, when one of the Y direction and the X direction is one direction, and the other of the Y direction and the X direction is the other direction, positional information items based on a plurality of ON pixels PX_ON of which at least portions overlap each other as viewed in the other direction are identified as a group in which the positional information items are arranged in the one direction, and the stability of the ejection is determined using the results of the identification.

First to sixth determination examples when the determination method based on the arrangement of groups is used in the determining step S20 are sequentially described below.

4-2-1. First Determination Example

Figure 7:
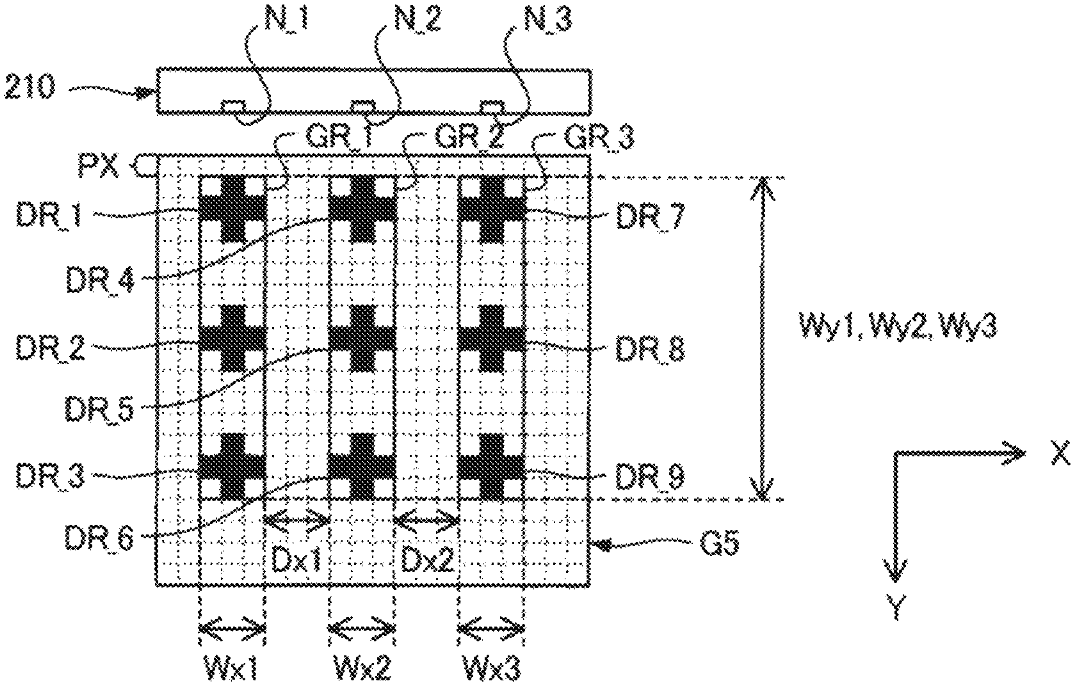
FIG. 7 is a diagram illustrating grouping in first to fourth determination examples in a determining step according to the embodiment.

FIG. 7 is a diagram illustrating grouping in the first to fourth determination examples in the determining step S20 according to the embodiment. In the first to fourth determination examples, in the grouping step S21, the droplets DR_1 to DR_9 included in the image G5 are grouped into groups in which the droplets DR_1 to DR_9 are arranged in the Y direction. For example, an XY coordinate system defined by coordinate axes along the X direction and the Y direction is set, and droplets DR of which a difference between X coordinate values is equal to or smaller than a predetermined threshold among the droplets DR_1 to DR_9 are grouped into the same group.

More specifically, for example, when a range of X coordinate values of a droplet DR_k is Ak=[Xk_mini, Xk_max], and $Ak-1 \cap Ak \neq \phi$ is satisfied, a droplet DR_k−1 and the droplet DR_k belong to the same group. In this case, k is a natural number greater than or equal to 2 and less than or equal to n. In the example illustrated in FIG. 7, n is 9. $\phi$ is an empty set.

In this case, when $Ak-2 \cap Ak=\phi$ is satisfied, $Ak-2 \cap Ak-1 \neq \phi$ is satisfied, and $Ak-1 \cap Ak \neq \phi$ is satisfied, a droplet DR_k−2 and the droplet DR_k belong to the same group. Therefore, even when an X coordinate value of the droplet DR_k−2 is different from an X coordinate value of the droplet DR_k, the droplet DR_k−2 and the droplet DR_k may belong to the same group.

In the grouping described above, when droplets DR ejected from the same nozzle N stably fly, the droplets DR belong to the same group. In the example illustrated in FIG. 7, the droplets DR_1 to DR_3 ejected from the nozzle N_1 belong to a group GR_1, the droplets DR_4 to DR_6 ejected from the nozzle N_2 belong to a group GR_2, and the droplets DR_7 to DR_9 ejected from the nozzle N_3 belong to a group GR_3. Each of the groups GR_1 to GR_3 may be hereinafter referred to as a group GR.

As described above, in the first to fourth determination examples, the plurality of positional information items D5_1 to D5_*n* are grouped into the groups GR_1 to GR_3 in which the positional information items D5_1 to D5_*n* are arranged in the Y direction. In this case, the range of each of the groups GR_1 to GR_3 is defined as a minimal rectangle including the droplets DR belonging to the same group. Then, the stability of the ejection is evaluated based on the rectangles.

Figure 8:
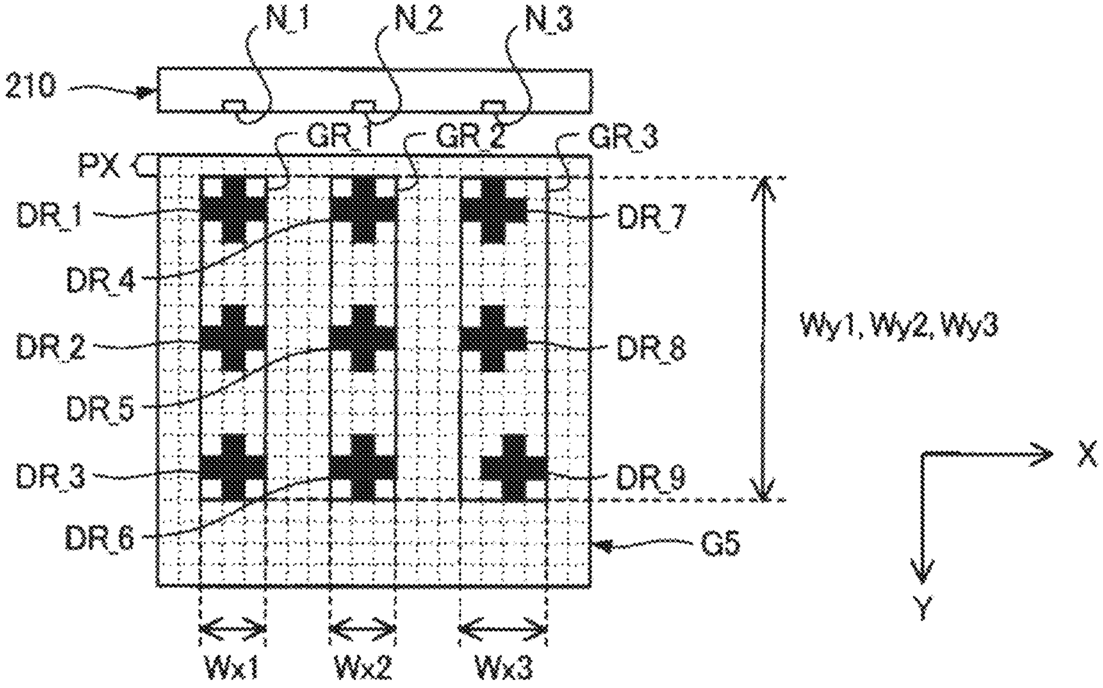
FIG. 8 is a diagram illustrating evaluation in the first determination example in the determining step according to the embodiment.

FIG. 8 is a diagram illustrating the first determination example in the determining step S20 according to the embodiment. In the first determination example, widths Wx1, Wx2, and Wx3 of rectangles that define the ranges of the groups GR_1, GR_2, and GR_3 in the X direction are calculated. As flight trajectories of the droplets DR from the corresponding nozzles N are more curved, the widths Wx1, Wx2, and Wx3 become longer.

In the example illustrated in FIG. 8, the flight trajectory of the droplet DR ejected from the nozzle N_3 is curved, and the width Wx3 is longer than the width Wx1 or the width Wx2. When the flight trajectory of a droplet DR is largely curved, droplets DR ejected from different nozzles N may belong to the same group, and the width of the group may increase.

Therefore, when a difference between the widths Wx1, Wx2, and Wx3 of the groups GR_1, GR_2, and GR_3 in the X direction exceeds an allowable range, it is determined that the ejection state is unstable.

4-2-2. Second Determination Example

Figure 9:
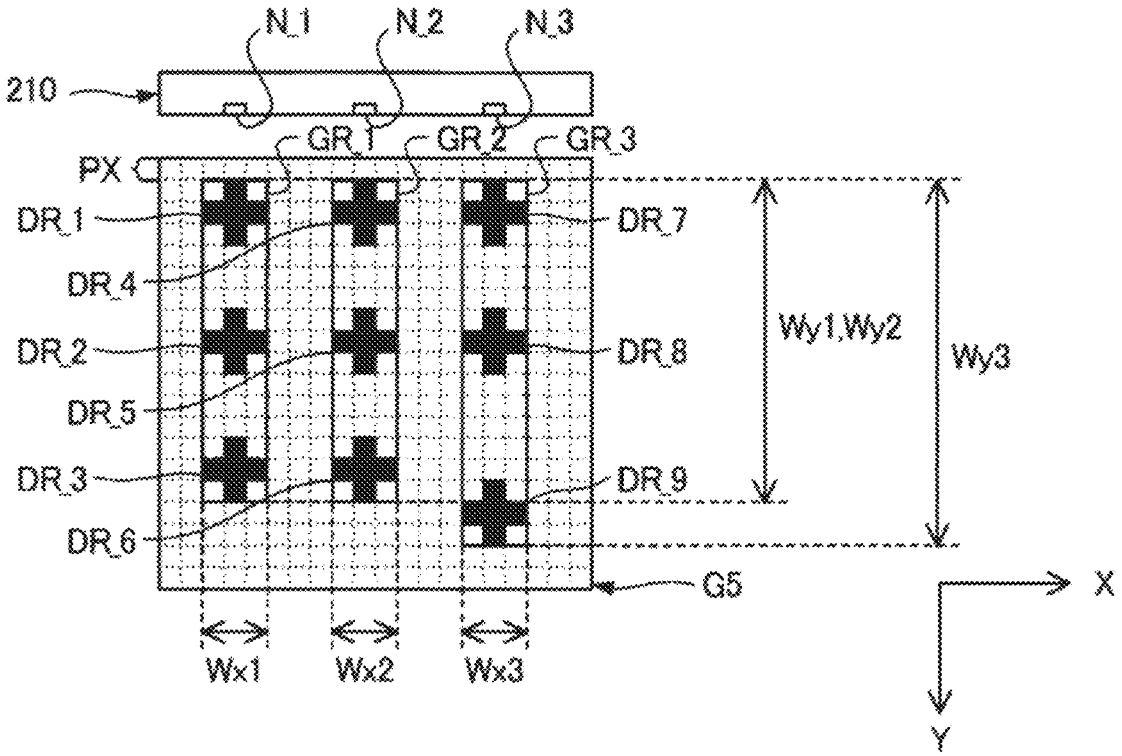
FIG. 9 is a diagram illustrating evaluation in the second determination example in the determining step according to the embodiment.

FIG. 9 is a diagram illustrating the second determination example in the determining step S20 according to the embodiment. In the second determination example, widths Wy1, Wy2, and Wy3 of rectangles that define the ranges of the groups GR_1, GR_2, and GR_3 in the Y direction are calculated. When the speeds at which the droplets are ejected from the nozzles N_1 to N_3 do not vary, the widths Wy1, Wy2, and Wy3 are equal to each other. On the other hand, when the speeds at which the droplets are ejected from the nozzles N_1 to N_3 vary, at least two of the widths Wy1, Wy2, and Wy3 are different from each other.

In the example illustrated in FIG. 9, the speed at which the droplet DR is ejected from the nozzle N_3 is higher than the speed at which the droplets DR are ejected from the other nozzles N, and the width Wy3 is longer than the width Wy1 or the width Wy2.

Therefore, when a difference between the widths Wy1, Wy2, and Wy3 of the groups GR_1, GR_2, and GR_3 in the Y direction exceeds an allowable range, it is determined that the ejection state is unstable.

4-2-3. Third Determination Example

Figure 10:
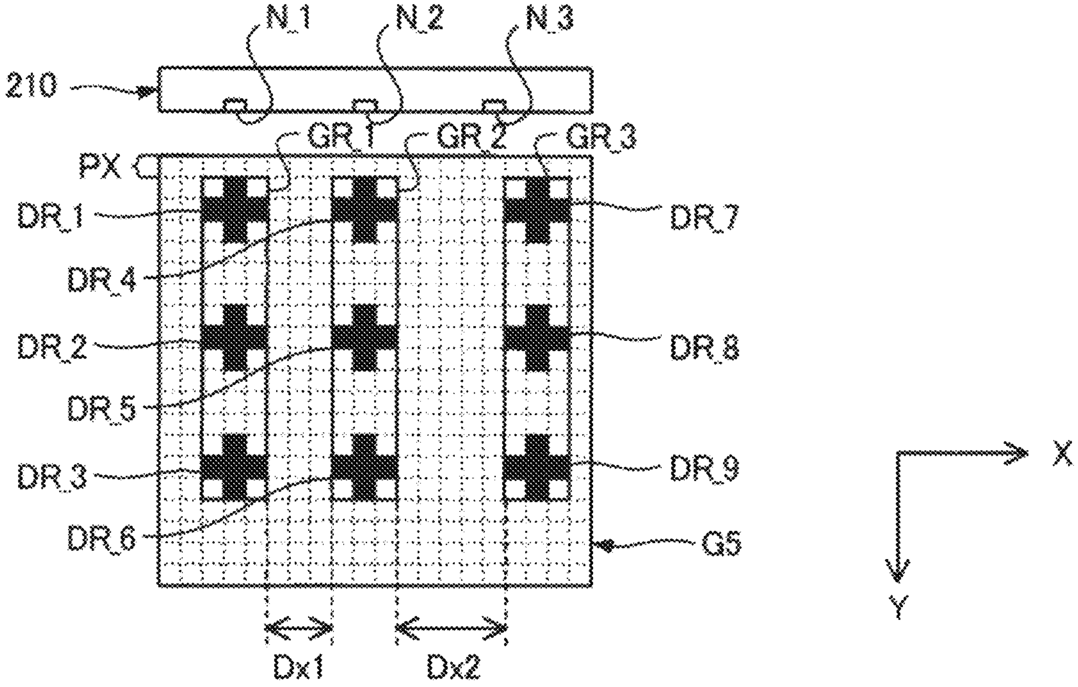
FIG. 10 is a diagram illustrating evaluation in the third determination example in the determining step according to the embodiment.

FIG. 10 is a diagram illustrating the third determination example in the determining step S20 according to the embodiment. In the third determination example, intervals Dx1 and Dx2 between the groups GR_1 to GR_3 are calculated. When pitches between the nozzles are equal to each other, droplets DR are ejected from all the nozzles N_1 to N_3, and the intervals Dx1 and Dx2 between the groups GR_1 to GR_3 are equal to each other, it is determined that the ejection state is stable. On the other hand, when the intervals Dx1 and Dx2 are different from each other, one or more of the ejected droplets DR do not fly straight, a flight trajectory of the one or more ejected droplets DR is curved, and thus it is determined that the ejection state is unstable. In this case, the difference between the intervals Dx1 and Dx2 can be quantified as the degree of instability.

In the example illustrated in FIG. 10, the flight trajectory of the droplet DR ejected from the nozzle N_3 is curved, and the interval Dx2 is longer than the interval Dx1.

Therefore, when a variation in the intervals Dx1 and Dx2 between the adjacent groups GR in the X direction exceeds an allowable range, it is determined that the ejection state is unstable.

4-2-4. Fourth Determination Example

Figure 11:
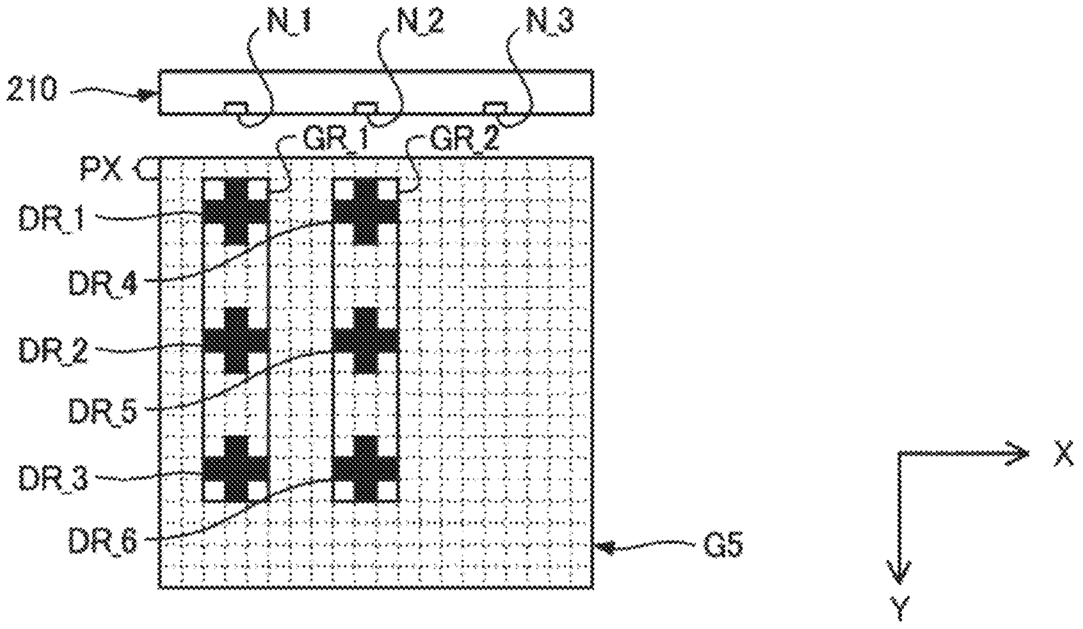
FIG. 11 is a diagram illustrating evaluation in the fourth determination example in the determining step according to the embodiment.

FIG. 11 is a diagram illustrating the fourth determination example in the determining step S20 according to the embodiment. In the fourth determination example, the difference between the number of nozzles N from which droplets DR are ejected in an imaging range and the number of groups in which the droplets DR are arranged is calculated. When the difference is 0, it is determined that the ejection state is stable. On the other hand, when the difference is not 0, it is determined that the ejection state is unstable. In this case, the difference can be quantified as the degree of instability.

In the example illustrated in FIG. 11, a droplet DR is not ejected from the nozzle N_3, and the number of the nozzles N is larger than the number of the groups.

Therefore, when the difference between the number of the groups GR and the number of the nozzles N exceeds an allowable range, it is determined that the ejection state is unstable.

4-2-5. Fifth Determination Example

Figure 12:
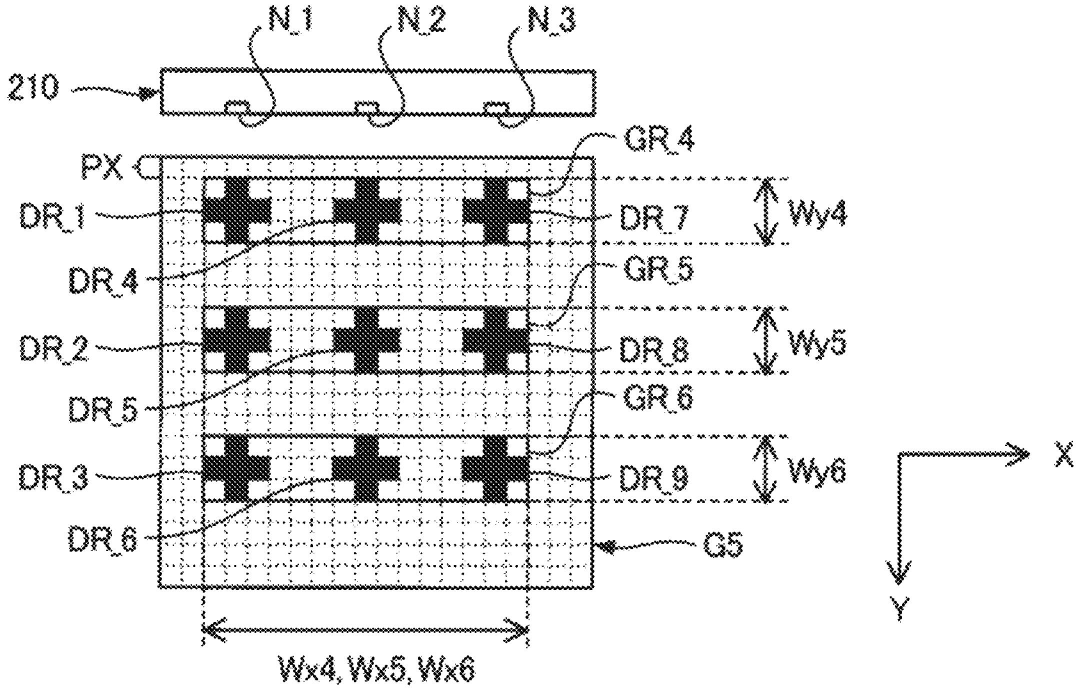
FIG. 12 is a diagram illustrating grouping in fifth and sixth determination examples in the determining step according to the embodiment.

FIG. 12 is a diagram illustrating grouping in the fifth and sixth determination examples in the determining step S20 according to the embodiment. In the fifth and sixth determination examples, in the grouping step S21, the droplets DR_1 to DR_9 included in the image G5 are grouped into groups in which the droplets DR_1 to DR_9 are arranged in the X direction. In this grouping, a method that is the same as or similar to the method described above with reference to FIG. 7 is used except that the direction in which the droplets DR are arranged in the groups is different from that in the method described above with reference to FIG. 7. That is, for example, an XY coordinate system defined by two coordinate axes along the X direction and the Y direction is set, and droplets DR of which a difference between Y coordinate values is equal to or smaller than a predetermined threshold among the droplets DR_1 to DR_9 are grouped into the same group.

In the grouping described above, droplets DR having the same history in terms of an ejection timing, droplet division, droplet coalescence, or the like belong to the same group. In the example illustrated in FIG. 12, the droplets DR_1, DR_4, and DR_7 belong to a group GR_4, the droplets DR_2, DR_5, and DR_8 belong to a group GR_5, and the droplets DR_3, DR_6, and DR_9 belong to a group GR_6. Each of the groups GR_4 to GR_6 may be hereinafter referred to as a group GR.

As described above, in the fifth and sixth determination examples, the plurality of positional information items D5_1 to D5_*n* are grouped into the groups GR_4 to GR_6 in which the positional information items D5_1 to D5_*n* are arranged in the X direction. The range of each of the groups GR_4 to GR_6 is defined as a minimal rectangle including the droplets DR belonging to the same group. The stability of the ejection is evaluated based on the rectangles. This evaluation method is particularly effective when an image of the droplets is captured at one timing.

Figure 13:
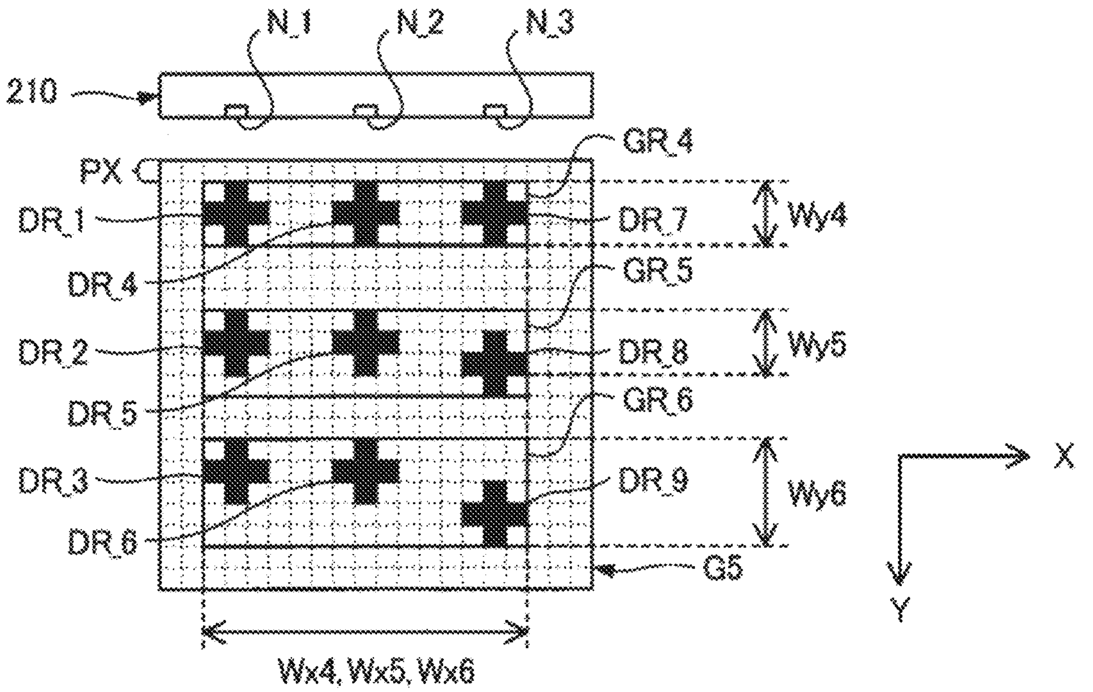
FIG. 13 is a diagram illustrating evaluation in the fifth determination example in the determining step according to the embodiment.

FIG. 13 is a diagram illustrating the fifth determination example in the determining step S20 according to the embodiment. In the fifth determination example, widths Wy4, Wy5, and Wy6 of rectangles that define the ranges of the groups GR_4, GR_5, and GR_6 in the Y direction are calculated. The smaller a variation in the speeds at which the droplets DR are ejected from the nozzles N_1 to N_3, the shorter each of the widths Wy4, Wy5, and Wy6.

In the example illustrated in FIG. 13, the speed at which the droplet DR is ejected from the nozzle N_3 is higher than the speed at which the droplets DR are ejected from the other nozzles N, and the width Wy6 is longer than the width Wy4 or the width Wy5.

Therefore, when a difference between the widths Wy4, Wy5, and Wy6 of the groups GR_4, GR_5, and GR_6 in the Y direction exceeds an allowable range, it is determined that the ejection state is unstable. In this determination method, when a plurality of results are obtained using a plurality of waveforms as illustrated in FIG. 13, a waveform that causes the width Wy6 to be small and causes the ejection state to be determined to be stable may be used.

4-2-6. Sixth Determination Example

Figure 14:
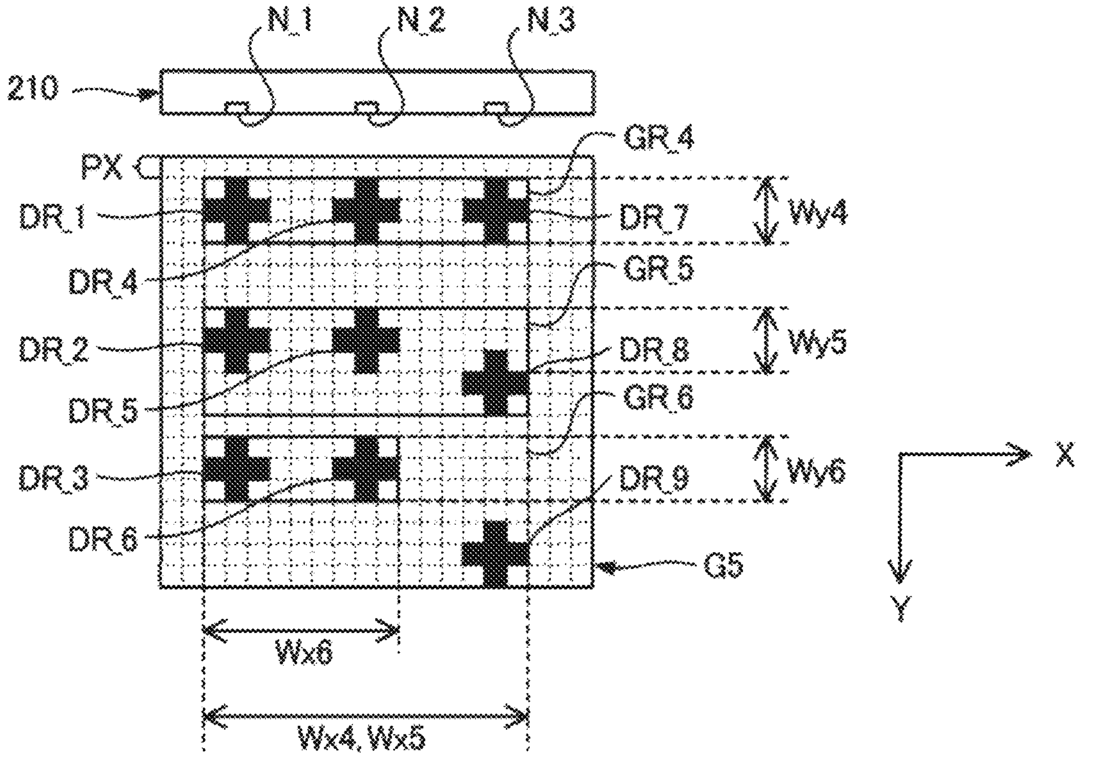
FIG. 14 is a diagram illustrating evaluation in the sixth determination example in the determining step according to the embodiment.

FIG. 14 is a diagram illustrating the sixth determination example in the determining step S20 according to the embodiment. In the sixth determination example, widths Wx4, Wx5, and Wx6 of rectangles that define the ranges of the groups GR_4, GR_5, and GR_6 in the X direction are calculated. When a variation in the speeds at which the droplets DR are ejected from the nozzles N_1 to N_3 becomes larger than a predetermined value, at least two of the widths Wx4, Wx5, and Wx6 are different from each other.

In the example illustrated in FIG. 14, since the speed at which the droplet DR is ejected from the nozzle N_3 is higher than the speed at which the droplets DR are ejected from the other nozzles N, the droplet DR_9 does not belong to any group, and as a result, the width Wx6 is shorter than the width Wx4 or the width Wx5.

Therefore, it is possible to determine the ejection state based on the widths Wx4, Wx5, and Wx6 of the groups GR_4, GR_5, and GR_6 in the X direction.

The above-described method of determining the ejection state determines the ejection state of the liquid ejecting head 210 having the plurality of nozzles N that are arrayed in the X direction and from which ink is ejected in the Y direction. In this case, the Y direction is an example of a "first direction, the X direction is an example of a "second direction intersecting the first direction", and the ink is an example of "liquid".

As described above, the method of determining the ejection state includes the acquiring step S10 and the determining step S20. The acquiring step S10 acquires the plurality of positional information items D5_1 to D5_*n* by capturing, at a plurality of timings, images of droplets DR ejected from the plurality of nozzles N or by capturing an image of droplets DR ejected at a plurality of timings from the plurality of nozzles N. The determining step S20 determines the ejection state based on the plurality of positional information items D5_1 to D5_*n*.

In the above-described method of determining the ejection state, since a plurality of positional information items D5_1 to D5_*n* are acquired for each nozzle N by capturing, at a plurality of timings, images of droplets DR ejected from the plurality of nozzles N or by capturing an image of droplets DR ejected at a plurality of timings from the plurality of nozzles N, it is possible to obtain the plurality of positional information items D5_1 to D5_*n* indicating the positions of the droplets DR at the plurality of timings based on the ejection start timing for the plurality of nozzles N. The ejection state is determined based on the plurality of positional information items D5_1 to D5_*n*, and thus it is possible to obtain a plurality of factors regarding the stability of the ejection as determination results without repeating image capturing for each nozzle N. Therefore, it is possible to easily determine a plurality of factors regarding the stability of the ejection with reduced ink consumption in a reduced number of processes.

In the embodiment, as described above, in the determining step S20, the plurality of positional information items D5_1 to D5_*n* are grouped into the groups GR_1 to GR_3 in which the positional information items D5_1 to D5_*n* are arranged in the Y direction, and the ejection state is determined based on the widths Wx1, Wx2, and Wx3 of the groups GR_1, GR_2, and GR_3 in the X direction. Therefore, it is possible determine, as the ejection state, a difference between the directions in which droplets DR are ejected from the nozzles N.

In this case, as described above, in the determining step S20, when a difference between the widths Wx1, Wx2, and Wx3 of the groups GR_1, GR_2, and GR_3 in the X direction exceeds the allowable range, it is determined that the ejection state is unstable. Therefore, when a difference between the directions in which droplets DR are ejected from the nozzles N exceeds the allowable range, it is possible to determine that the ejection state is unstable.

In addition, as described above, in the determining step S20, the plurality of positional information items D5_1 to D5_*n* are grouped into the groups GR_1 to GR_3 in which the positional information items D5_1 to D5_*n* are arranged in the Y direction, and the ejection state is determined based on the widths Wy1, Wy2, and Wy3 of the groups GR_1, GR_2, and GR_3 in the Y direction. Therefore, it is possible to determine, as the ejection state, a difference between the speeds at which the droplets DR are ejected from the nozzles N.

In this case, as described above, in the determining step S20, when a difference between the widths Wy1, Wy2, and Wy3 of the groups GR_1, GR_2, and GR_3 in the Y direction exceeds the allowable range, it is determined that the ejection state is unstable. Therefore, when a difference between the speeds at which the droplets DR are ejected from the nozzles N exceeds an allowable range, it is possible to determine that the ejection state is unstable.

In addition, as described above, in the determining step S20, the plurality of positional information items D5_1 to D5_*n* are grouped into the groups GR_1 to GR_3 in which the positional information items D5_1 to D5_*n* are arranged in the Y direction, and the ejection state is determined based on the intervals Dx1 and Dx2 between the adjacent groups GR in the X direction. Therefore, it is possible to determine, as the ejection state, a variation in the ejection positions of the nozzles N.

In this case, as described above, in the determining step S20, when a variation in the intervals Dx1 and Dx2 between the adjacent groups GR in the X direction exceeds the allowable range, it is determined that the ejection state is unstable. Therefore, when a variation in the ejection positions of the nozzles N exceeds an allowable range, it is possible to determine that the ejection state is unstable.

In addition, as described above, in the determining step S20, the plurality of positional information items D5_1 to D5_*n* are grouped into the groups GR_1 to GR_3 in which the positional information items D5_1 to D5_*n* are arranged in the Y direction, and the ejection state is determined based on the number of the groups GR and the number of the nozzles N. Therefore, it is possible to determine, as the ejection state, whether a nozzle N from which a droplet is not ejected is present.

In this case, as described above, in the determining step S20, when the difference between the number of the groups GR and the number of the nozzles N exceeds the allowable range, it is determined that the ejection state is unstable. Therefore, when the number of nozzles N from which a droplet is not ejected exceeds an allowable range, it is possible to determine that the ejection state is unstable.

In addition, as described above, in the determining step S20, the plurality of positional information items D5_1 to D5_*n* are grouped into the groups GR_4 to GR_6 in which the positional information items D5_1 to D5_*n* are arranged in the X direction, and the ejection state is determined based on the widths Wy4, Wy5, and Wy6 of the groups GR_4, GR_5, and GR_6 in the Y direction. Therefore, it is possible to determine, as the ejection state, a difference between the speeds at which the droplets DR are ejected from the nozzles N.

In this case, as described above, in the determining step S20, when a difference between the widths Wy4, Wy5, and Wy6 of the groups GR_4, GR_5, and GR_6 in the Y direction exceeds the allowable range, it is determined that the ejection state is unstable. Therefore, when a difference between the speeds at which the droplets DR are ejected from the nozzles N exceeds the allowable range, it is possible to determine that the ejection state is unstable.

In addition, as described above, in the determining step S20, the plurality of positional information items D5_1 to D5_*n* are grouped into the groups GR_4 to GR_6 in which the positional information items D5_1 to D5_*n* are arranged in the X direction, and the ejection state is determined based on the widths Wx4, Wx5, and Wx6 of the groups GR_4, GR_5, and GR_6 in the X direction. Therefore, it is possible to determine, as the ejection state, a difference between the speeds at which the droplets DR are ejected from the nozzles N.

In addition, as described above, in the acquiring step S10, the plurality of positional information items D5_1 to D5_*n* are acquired by binarizing, for each of the pixels PX, results obtained by the image capturing of the droplets DR ejected from the plurality of nozzles N into ON pixels PX_ON in which the droplets DR are present and OFF pixels PX_OFF in which the droplets DR are not present. Therefore, as compared with a case where the binarization is not performed, it is possible to measure the positions of the droplets DR or the widths of the groups GR with high accuracy.

In addition, as described above, in the acquiring step S10, the plurality of positional information items D5_1 to D5_*n* are acquired using, as a positional information item, an information item indicating a position based on a group of adjacent ON pixels PX_ON. Therefore, it is possible to use the binarized results of the image capturing to acquire the plurality of positional information items D5_1 to D5_*n* indicating the positions of the respective droplets DR.

In addition, as described above, in the determining step S20, when one of the Y direction and the X direction is one direction, and the other of the Y direction and the X direction is the other direction, positional information items based on a plurality of ON pixels PX_ON separated from each other by a distance shorter than a predetermined threshold (for example, two pixels) as viewed in the other direction are identified as a group GR in which the positional information items are arranged in the one direction. As processing of comparing the distance with the predetermined threshold, a method of simply calculating the distance between the pixels of the positional information items, and a method of calculating the distance by changing, to ON pixels, OFF pixels present around the ON pixels PX_ON of the positional information items and separated from the ON pixels by the predetermined threshold or less and determining whether the ON pixels overlap each other after the changing. In addition, more preferably, positional information items based on a plurality of ON pixels PX_ON of which at least portions overlap each other as viewed in the other direction are identified as a group GR in which the positional information items are arranged in the one direction. According to these methods, it is possible to use the binarized results of the image capturing to group the plurality of positional information items D5_1 to D5_*n* into groups in which the positional information items D5_1 to D5_*n* are arranged in the X direction or the Y direction.

In addition, as described above, in the acquiring step S10, the noise removal is performed to remove noise from the results of image capturing of the droplets DR ejected from the plurality of nozzles N using the background image G2 obtained as a result of the image capturing in a state in which a droplet DR is not ejected from the plurality of nozzles N. Therefore, it is possible to improve the accuracy of the positions indicated in the plurality of positional information items D5_1 to D5_*n*.

As described above, the method of determining the ejection state is performed using the ejection state determining apparatus 400. The ejection state determining apparatus 400 includes the acquiring section 451 and the determining section 452. The acquiring section 451 acquires the plurality of positional information items D5_1 to D5_*n* by capturing, at the plurality of timings, images of the droplets DR ejected from the plurality of nozzles N. The determining section 452 determines the ejection state based on the plurality of positional information items D5_1 to D5_*n*. In the ejection state determining apparatus 400, since the method of determining the ejection state is performed, it is possible to easily determine a plurality of factors regarding the stability of the ejection with reduced ink consumption in a reduced number of processes.

As described above, the ejection state determining apparatus 400 is implemented using the program PRG which is an example of an "ejection state determining program". The program PRG causes a computer to execute the acquiring step S10 and the determining step S20. In the program PRG, since the method of determining the ejection state is performed, it is possible to easily determine a plurality of factors regarding the stability of the ejection with reduced ink consumption in a reduced number of processes.

5. Modifications

Each embodiment exemplified above can be modified. Specific modifications that are applicable to each embodiment described above are exemplified below. Two or more aspects selected from the following examples may be combined as appropriate so as not to contradict each other.

5-1. First Modification

Figure 15:
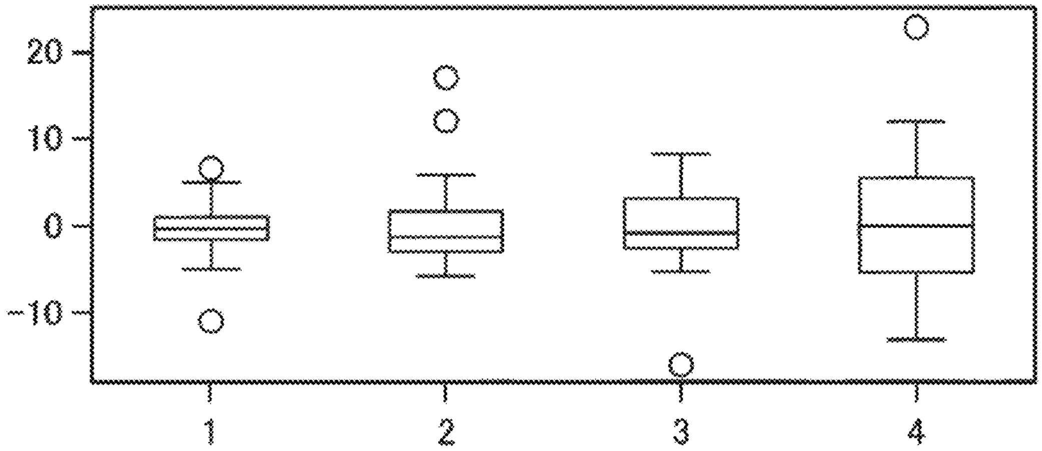
FIG. 15 is a diagram illustrating a method of determining the ejection state according to a first modification.

FIG. 15 is a diagram illustrating a method of determining the ejection state according to a first modification. In the first modification, the determination result obtained in the embodiment described above is quantified as the degree of stability, and the display device 410 displays the quantified determination result. FIG. 15 illustrates, as a box plot, a variation in Y coordinates of the droplets DR of each of the groups when the grouping is performed as described above in the fifth and sixth determination examples. By visualizing the degree of stability in this manner, it is possible to compare flying states of the droplets DR or determine whether or not the droplets DR are superior and to use the determination results for optimization of design parameters or the like.

In addition, when the grouping is performed in the first to fourth determination examples as described above, a distribution of the X coordinates of the droplets DR may be obtained as a result of quantitative evaluation. Similarly, when the grouping is performed in the fifth and sixth determination examples as described above, a distribution of the Y coordinates of the droplets DR may be obtained as a result of the quantitative evaluation. In addition, variance (standard deviation) of the coordinates or the like may be obtained as a result of the quantitative determination.

5-2. Second Modification

When the grouping is performed in the first to fourth determination examples as described above, it is possible to obtain the number of satellite droplets by counting the number of droplets DR belonging to each group and obtaining a difference between each of the counted numbers and each of the numbers of times that the drive elements 211 are driven.

5-3. Third Modification

When a plurality of groups are present, the numbers of droplets DR belonging to the groups may be compared and the degree of instability may be calculated based on the results of the comparison. For example, when the numbers of the droplets DR belonging to the groups are equal, it is determined that the ejection state is stable. On the other hand, when the numbers of the droplets DR belonging to the groups are not equal, the degree of instability is calculated based on a difference between the numbers of the droplets DR.

5-4. Fourth Modification

In the embodiment described above, the first to sixth determination examples are exemplified as the determination method in the determining step, but the determination method is not limited thereto. For example, any two or more of the first to sixth determination examples may be combined or another determination example may be added to the determination method.

What is claimed is:

1. A method of determining an ejection state of a liquid ejecting head having a plurality of nozzles that are arrayed in a second direction intersecting a first direction and from which liquid is ejected in the first direction, the method comprising:

an acquiring step of acquiring a plurality of positional information items by capturing, at a plurality of timings, images of droplets formed by the liquid ejected from the plurality of nozzles; and a determining step that groups the plurality of positional information items into first groups in which the positional information items are arranged in the first direction or into second groups in which the positional information items are arranged in the second direction and that determines the ejection state based on the first groups or the second groups.

2. The method of determining the ejection state according to claim 1, wherein the determining step groups the plurality of positional information items into the first groups and determines the ejection state based on widths of the first groups in the second direction.

3. The method of determining the ejection state according to claim 2, wherein the determining step determines that the ejection state is unstable when a difference between the widths of the first groups in the second direction exceeds an allowable range.

4. The method of determining the ejection state according to claim 1, wherein the determining step groups the plurality of positional information items into the first groups and determines the ejection state based on widths of the first groups in the first direction.

5. The method of determining the ejection state according to claim 4, wherein the determining step determines that the ejection state is unstable when a difference between the widths of the first groups in the first direction exceeds an allowable range.

6. The method of determining the ejection state according to claim 1, wherein the determining step groups the plurality of positional information items into the first groups and determines the ejection state based on an interval between the adjacent first groups in the second direction.

7. The method of determining the ejection state according to claim 6, wherein the determining step determines that the ejection state is unstable when a variation in the interval between the adjacent first groups in the second direction exceeds an allowable range.

8. The method of determining the ejection state according to claim 1, wherein the determining step groups the plurality of positional information items into the first groups and determines the ejection state based on the number of the first groups and the number of the nozzles.

9. The method of determining the ejection state according to claim 8, wherein the determining step determines that the ejection state is unstable when a difference between the number of the first groups and the number of the nozzles exceeds an allowable range.

10. The method of determining the ejection state according to claim 1, wherein the determining step groups the plurality of positional information items into the second groups and determines the ejection state based on widths of the second groups in the first direction.

11. The method of determining the ejection state according to claim 10, wherein the determining step determines that the ejection state is unstable when a difference between the widths of the second groups in the first direction exceeds an allowable range.

12. A method of determining an ejection state of a liquid ejecting head having a plurality of nozzles that are arrayed in a second direction intersecting a first direction and from which liquid is ejected in the first direction, the method comprising:

an acquiring step of acquiring a plurality of positional information items by capturing an image of droplets formed by the liquid ejected at a plurality of timings from the plurality of nozzles; and a determining step that groups the plurality of positional information items into first groups in which the plurality of positional information items are arranged in the first direction or into second groups in which the positional information items are arranged in the second direction and that determines the ejection state based on the first groups or the second groups.

13. A method of determining an ejection state of a liquid ejecting head having a plurality of nozzles that are arrayed in a second direction intersecting a first direction and from which liquid is ejected in the first direction, the method comprising:

an acquiring step of acquiring a plurality of positional information items by capturing, at a plurality of timings, images of droplets ejected from the plurality of nozzles; and a determining step of determining the ejection state based on the plurality of positional information items, wherein the acquiring step acquires the plurality of positional information items by binarizing results of the image capturing of the droplets ejected from the plurality of nozzles into an ON pixel in which the droplets are present and an OFF pixel in which the droplets are not present, the acquiring step acquires the plurality of positional information items by using, as a positional information item, an information item indicating a position based on a group of a plurality of adjacent ON pixels, when one of the first direction and the second direction is one direction, and the other of the first direction and the second direction is the other direction, the determining step identifies the plurality of positional information items based on a plurality of ON pixels separated from one another by a distance shorter than a predetermined threshold as viewed in the other direction or a plurality of ON pixels of which at least portions overlap as viewed in the other direction as a group in which the positional information items are arranged in the one direction.

14. The method of determining the ejection state according to claim 13, wherein the acquiring step removes noise from a result of the image capturing of the droplets ejected from the plurality of nozzles by using a background image obtained as a result of image capturing performed in a state in which a droplet is not ejected from the plurality of nozzles.

* * * * *